(12) United States Patent
Koda et al.

(10) Patent No.: US 12,259,033 B2
(45) Date of Patent: Mar. 25, 2025

(54) METHOD FOR MANUFACTURING ACTUATOR, AND ACTUATOR

(71) Applicant: Sony Interactive Entertainment Inc., Tokyo (JP)

(72) Inventors: Yuta Koda, Tokyo (JP); Keiji Togawa, Tokyo (JP); Hiroshi Osawa, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 252 days.

(21) Appl. No.: 17/798,610

(22) PCT Filed: Mar. 8, 2021

(86) PCT No.: PCT/JP2021/009058
§ 371 (c)(1),
(2) Date: Aug. 10, 2022

(87) PCT Pub. No.: WO2021/182414
PCT Pub. Date: Sep. 16, 2021

(65) Prior Publication Data
US 2023/0091582 A1 Mar. 23, 2023

(30) Foreign Application Priority Data

Mar. 9, 2020 (JP) ................................. 2020-040365

(51) Int. Cl.
*F16H 55/18* (2006.01)
*F16H 1/06* (2006.01)
(52) U.S. Cl.
CPC ............... *F16H 55/18* (2013.01); *F16H 1/06* (2013.01)

(58) Field of Classification Search
None
See application file for complete search history.

(56) References Cited

U.S. PATENT DOCUMENTS 10,436,303 B2 * 10/2019 Sefcik ..................... F16H 57/12

FOREIGN PATENT DOCUMENTS

| JP | 62074167 U | 5/1987 |
| JP | 1162759 A | 3/1999 |
| JP | 2003117858 A | 4/2003 |
| JP | 2009191998 A | 8/2009 |

OTHER PUBLICATIONS

International Search Report for corresponding PCT Application No. PCT/JP2021/009058, 4 pages, dated May 25, 2021.

* cited by examiner

*Primary Examiner* — Vicky A Johnson
(74) *Attorney, Agent, or Firm* — Kilpatrick Townsend & Stockton LLP

(57) ABSTRACT

A work of incorporating a speed reduction mechanism including a scissors gear into a gear case is facilitated. In a state where the angular positions of gear teeth of a first gear and the angular positions of gear teeth of a scissors gear are made to coincide with each other against the elastic force of a torsion spring (19), these angular positions are fixed by a fixing member (position fixing step). The first gear, the scissors gear, and a second gear are housed in a gear case, and the gear teeth of the second gear are made to engage with the gear teeth of the first gear and the gear teeth of the scissors gear (gear incorporating step). The fixing of the angular position of the first gear and the angular position of the scissors gear by the fixing member is released through an opening formed in the gear case.

7 Claims, 15 Drawing Sheets

F I G . 7A
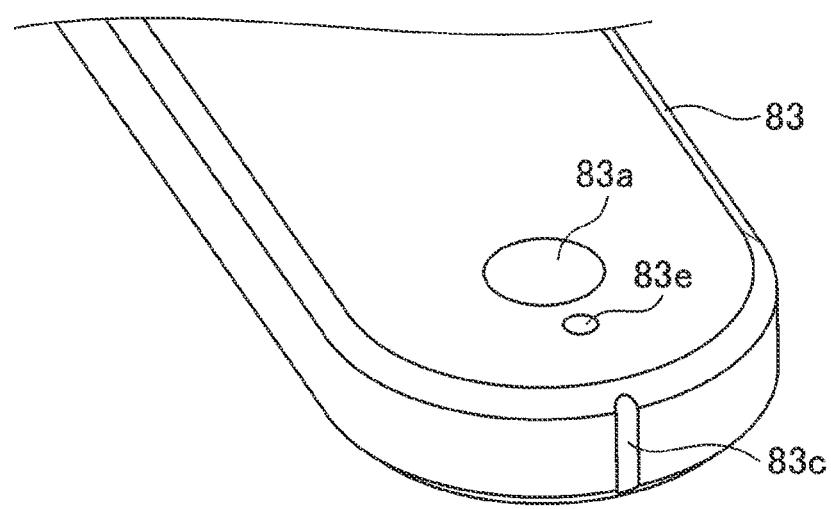
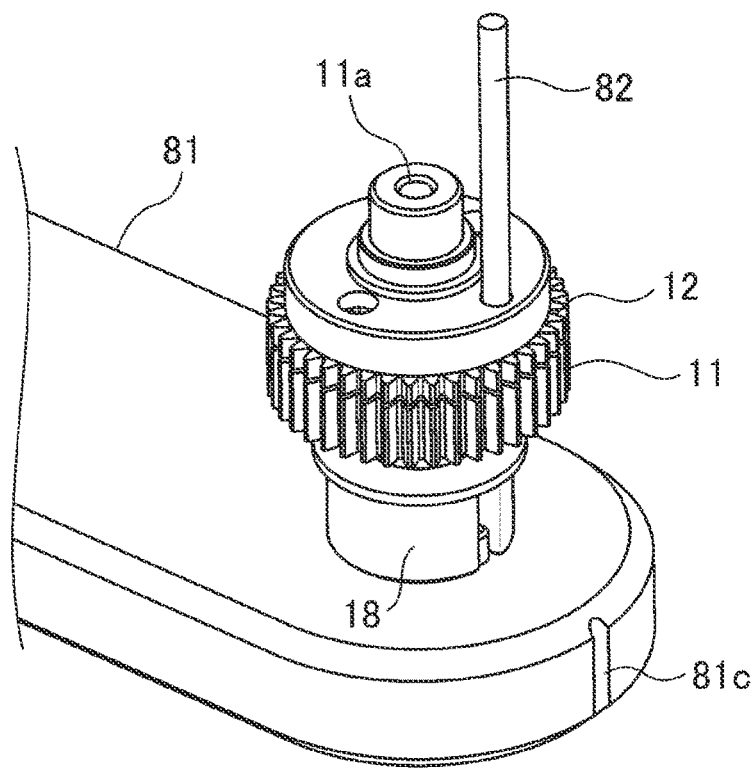

METHOD FOR MANUFACTURING ACTUATOR, AND ACTUATOR

TECHNICAL FIELD

The present disclosure relates to an actuator and a manufacturing method thereof.

BACKGROUND ART

Robots capable of bipedal walking and robots capable of quadrupedal walking have been developed (for example, PTL 1). The robot has a plurality of actuators for moving each part of the body. Some actuators include an electric motor and a speed reduction mechanism that includes a plurality of gears and decelerates the rotation received from the electric motor. A gap between gear teeth of two gears (i.e., backlash) causes noise and vibration. Therefore, a scissors gear for eliminating the backlash may be attached to one of the gears (referred to as a first gear). The first gear and the scissors gear are combined in an axial direction, and the scissors gear is urged by a spring in a rotational direction with respect to the first gear. A gear tooth of the other gear (referred to as a second gear) is sandwiched between a gear tooth of the first gear and a gear tooth of the scissors gear. According to this structure, there is no gap between the gear tooth of the first gear and the gear tooth of the second gear, and noise and vibration are suppressed.

CITATION LIST

Patent Literature

[PTL 1] JP 2003-117858A

SUMMARY

Technical Problem

Since the spring urges the scissors gear, angular positions of the gear teeth of the first gear do not coincide with the angular positions of the gear teeth of the scissors gear. Therefore, in the process of manufacturing the actuator, the work of engaging the gear teeth of the second gear with the gear teeth of the first gear and the gear teeth of the scissors gear and incorporating these gears into a gear case becomes complicated.

Solution to Problem

The manufacturing method proposed in the present disclosure is a method for manufacturing an actuator including a speed reduction mechanism having a first gear, scissors gear, and second gear, in which gear teeth of the first gear and gear teeth of the scissors gear are engaged with gear teeth of the second gear. The manufacturing method includes a step of attaching an elastic member for urging the scissors gear in a rotational direction to the scissors gear and the first gear when combining the scissors gear and the first gear in the axial direction, a step of fixing angular position of the first gear and angular position of the scissors gear by a fixing member in a state where angular positions of the gear teeth of the first gear and angular positions of the gear teeth of the scissors gear are made to coincide with each other against force of the elastic member, a step of incorporating into a gear case, the first gear and the scissors gear whose angular positions are fixed by the fixing member and the second gear, to engage the gear teeth of the second gear with the gear teeth of the first gear and the gear teeth of the scissors gear, and a step of releasing the fixing of the angular position of the first gear and the angular position of the scissors gear performed by the fixing member, by using an opening formed on the gear case. According to this method, the work of incorporating a plurality of gears constituting the speed reduction mechanism in the gear case can be facilitated.

The actuator proposed in the present disclosure includes a speed reduction mechanism, and a gear case that houses the speed reduction mechanism. The speed reduction mechanism includes a first gear having gear teeth, a scissors gear that is combined with the first gear in an axial direction and has gear teeth, a second gear having gear teeth that engage with the gear teeth of the first gear and the gear teeth of the scissors gear, and an elastic member that is attached to the first gear and the scissors gear and urges the scissors gear in a rotational direction. The first gear has a fitting portion, and the scissors gear has a fitting portion. When an angular position of the fitting portion of the first gear coincides with an angular position of the fitting portion of the scissors gear, angular positions of the gear teeth of the first gear coincide with angular positions of the gear teeth of the scissors gear. An opening exposing the fitting portion of the first gear and the fitting portion of the scissors gear is formed on the gear case. According to this structure, since the manufacturing method described above is possible, the work of incorporating a plurality of gears constituting the speed reduction mechanism into the gear case can be facilitated.

BRIEF DESCRIPTION OF DRAWINGS

FIG. 7A is a diagram for describing a manufacturing method (position fixing process) and illustrates a state in which the scissors gear is rotated by using a second jig.

DESCRIPTION OF EMBODIMENT

Hereinafter, an embodiment of the present disclosure will be described with reference to the drawings. As an example of the embodiment, the present specification will describe an actuator 1 illustrated in FIG. 1 etc., and the manufacturing method thereof. Hereinafter, a direction along a rotation axis of an electric motor 2 which is a power source of the actuator 1 is referred to as an axial direction (the direction indicated by an arrow Z in FIG. 1 etc.).

[Whole Body]

Figure 1:
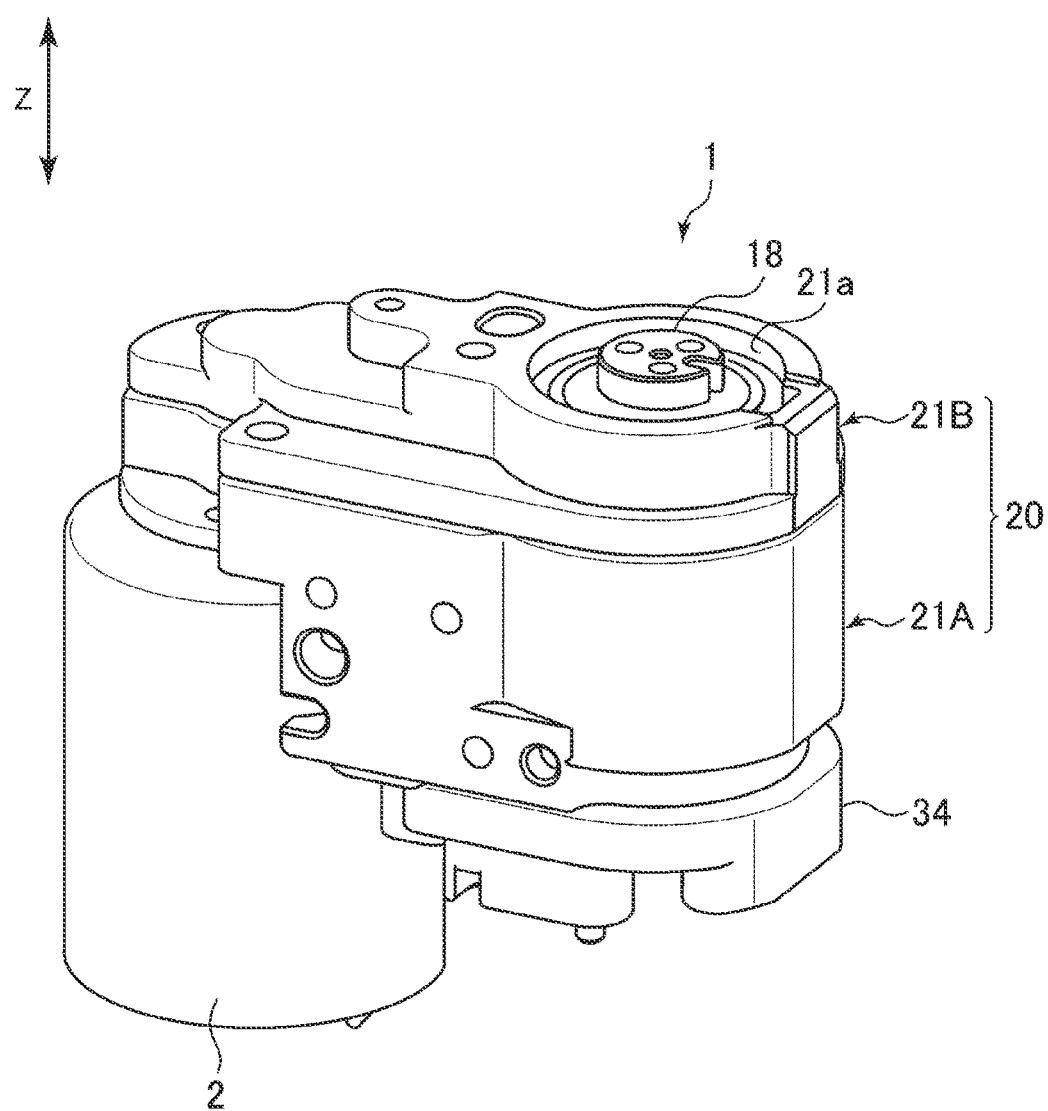
FIG. 1 is a perspective view of an actuator proposed in the present disclosure.

As illustrated in FIG. 1, the actuator 1 has the electric motor 2, a speed reduction mechanism 10, and a gear case 20. The electric motor 2 is a direct current (DC) motor or a stepping motor, for example, but may be another type of motor. The gear case 20 houses the speed reduction mechanism 10 (see FIG. 2). The gear case 20 has a first case member 21A and a second case member 21B that are combined with each other in the axial direction, for example. The speed reduction mechanism 10 has a plurality of gears and an output portion 18, and decelerates the rotation received from the electric motor 2 and transmits the decelerated rotation to the output portion 18. The gear case 20 has an opening 21a that exposes the output portion 18 in the axial direction. The output portion 18 is connected to a component included in a device (for example, a robot) on which the actuator 1 is mounted.

[Speed Reduction Mechanism]

Figure 3A:
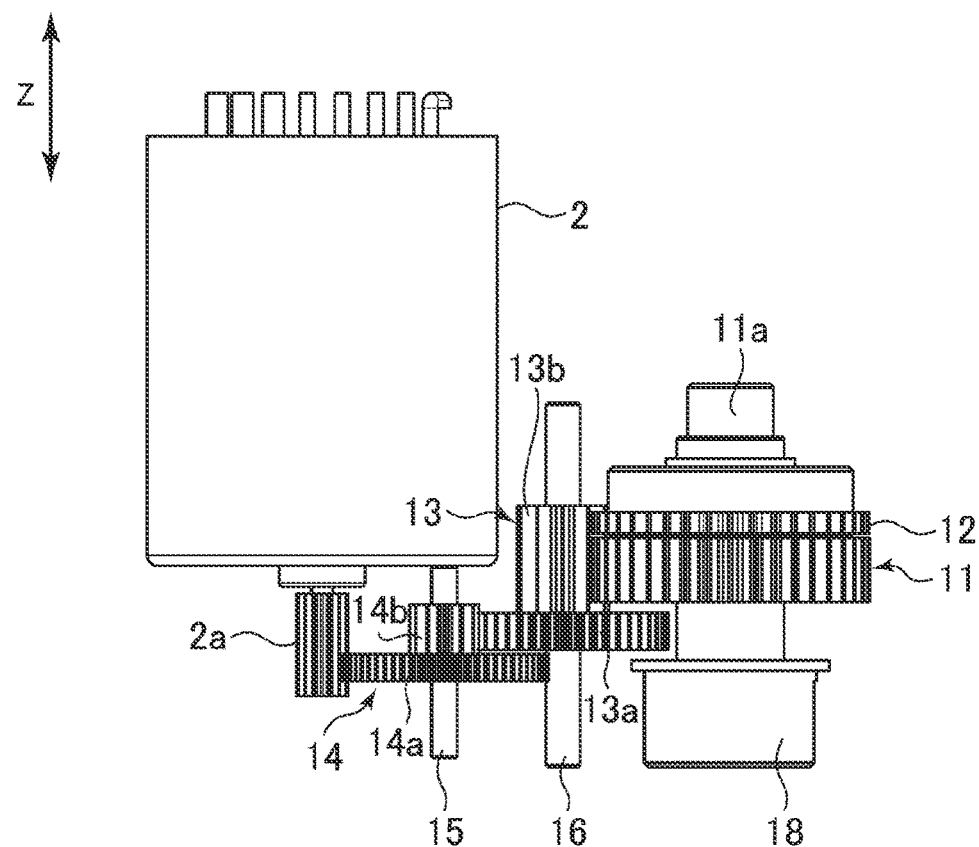
FIG. 3A is a plan view of an electric motor and a speed reduction mechanism constituting the actuator.
Figure 3B:
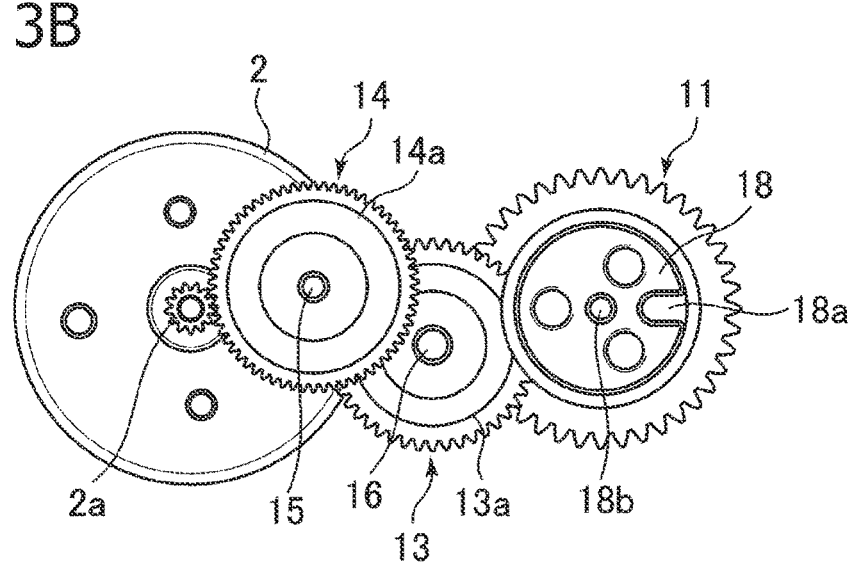
FIG. 3B is a view illustrating the electric motor and the speed reduction mechanism constituting the actuator viewed in an axial direction.

As illustrated in FIGS. 3A and 3B, the speed reduction mechanism 10 has a first gear 11, a scissors gear 12, a second gear 13, and a third gear 14, for example. Each of the gears 11, 12, and 13 has a plurality of gear teeth arranged in a rotational direction thereof. In the example of the actuator 1, these gears 11, 12, and 13 are external gears, and gear teeth are formed on the outer peripheral surfaces of each of the gears 11, 12, and 13. These gears 11, 12, and 13 are arranged in the order of the third gear 14, second gear 13, and first gear 11 from the electric motor 2 toward the output portion 18.

The third gear 14 has a large-diameter gear portion 14a and a small-diameter gear portion 14b, and these two gear portions 14a and 14b can rotate integrally around a support shaft 15. The second gear 13 has a large-diameter gear portion 13a and a small-diameter gear portion 13b, which can rotate integrally around a support shaft 16. The large-diameter gear portion 14a of the third gear 14 is engaged with a gear 2a fixed to an output shaft of the electric motor 2. The small-diameter gear portion 14b of the third gear 14 is engaged with the large-diameter gear portion 13a of the second gear 13. The small-diameter gear portion 13b of the second gear 13 is engaged with the first gear 11. The first gear 11 and the output portion 18 are arranged on the same rotation center line $A^x2$ (see FIG. 4) and are fixed to each other. In the example of the actuator 1, the first gear 11 and the output portion 18 are fixed to each other because they are integrally formed, but they may be fixed to each other by screws or bolts.

The number of gears and the arrangement of gears are not limited to the example of the actuator 1. For example, the actuator 1 can omit the second gear 13 or the third gear 14. In the absence of the second gear 13, the first gear 11 may directly engage with the third gear 14. In the absence of the third gear 14, the second gear 13 may directly engage with the gear 2a of the electric motor 2. In yet another example, the actuator 1 can omit both the second gear 13 and the third gear 14. In this case, the first gear 11 may be directly engaged with the gear 2a of the electric motor 2.

Further, in the example of the actuator 1, the speed reduction mechanism 10 includes only external gears. The speed reduction mechanism 10 may include an internal gear, unlike the example of the actuator 1. Further, the speed reduction mechanism 10 may include a bevel gear or a worm gear.

Figure 4:
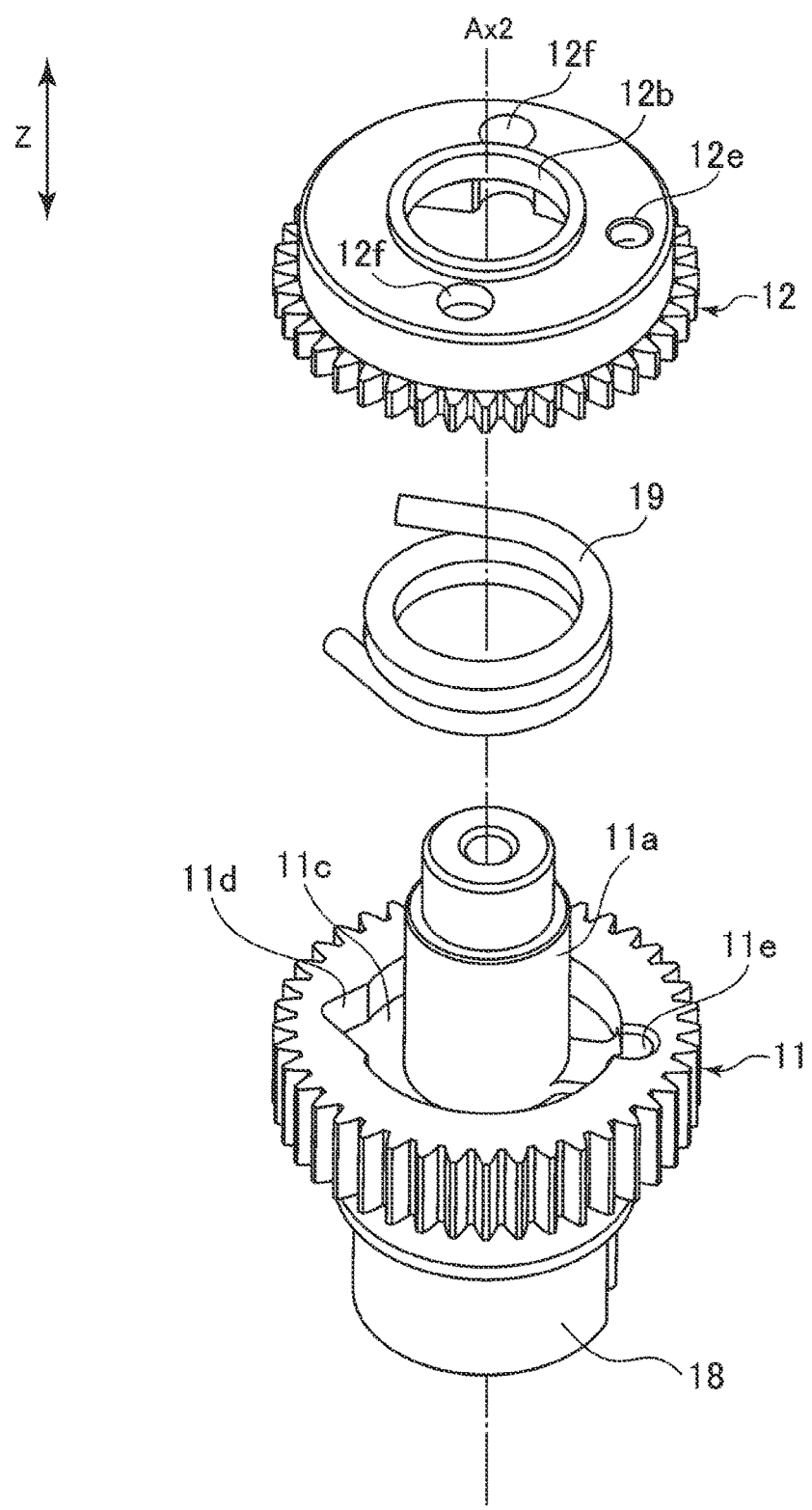
FIG. 4 is an exploded perspective view of a first gear, scissors, and a torsion spring.

As illustrated in FIG. 4, the scissors gear 12 is axially combined with the first gear 11. The scissors gear 12 is a gear having the same diameter as the first gear 11. The angular position of the scissors gear 12 (position in a rotational direction) and the angular position of the first gear 11 (position in a rotational direction) can be relatively changed. The actuator 1 has an elastic member that urges the scissors gear 12 in a rotational direction relative to the first gear 11. In the actuator 1, a torsion spring 19 is used as an example of the elastic member.

As illustrated in FIG. 3A, the gear teeth of the second gear 13 (more specifically, the small-diameter gear portion 13b) are engaged with both the gear teeth of the first gear 11 and the gear teeth of the scissors gear 12. Since the scissors gear 12 is urged in a rotational direction, the gear tooth of the second gear 13 that engages with a gear tooth of the first gear 11 are sandwiched between the gear tooth of the first gear 11 and a gear tooth of the scissors gear 12. As a result, it is suppressed that a gap is generated between the gear tooth of the second gear 13 and the gear tooth of the first gear 11 that are engaged with each other (prevention of a backlash).

In the example of the actuator 1, as illustrated in FIG. 4, the torsion spring 19 is arranged between the first gear 11 and the scissors gear 12. The first gear 11 and the scissors gear 12 have recesses 11c and 12c (see FIG. 8B) for housing the torsion spring 19. In the example of the actuator 1, the scissors gear 12 is attached to the first gear 11 located at the most downstream position in the rotation transmission path from the electric motor 2 to the output portion 18. As described above, by providing the scissors gear 12 to the first gear 11 which is located at the most downstream position and transmits a large torque, the backlash can be effectively reduced. Incidentally, the gear provided with the scissors gear 12 is not limited to the first gear 11 located at the most downstream position. The scissors gear 12 may be provided on a gear upstream of the first gear 11, for example, due to the influence of a positional relation with other components.

The first gear 11 and the scissors gear 12 are provided with a structure for temporarily fixing their relative angular position in the manufacturing process of the actuator 1. To be specific, as illustrated in FIG. 4, a fitting hole 11e is formed in the first gear 11, and a fitting hole 12e is formed in the scissors gear 12. Further, an opening 21e (see FIG. 10)

is formed in the gear case 20 (more specifically, the first case member 21A). In the manufacturing process of the actuator 1, the angular position of the first gear 11 and the angular position of the scissors gear 12 are fixed, and then the fixation of the angular position of the first gear 11 and the angular position of the scissors gear 12 is released by using the opening 21e. The manufacturing method using the fitting holes 11e and 12e and the opening 21e will be described in detail later.

[Bearing]

Figure 2:
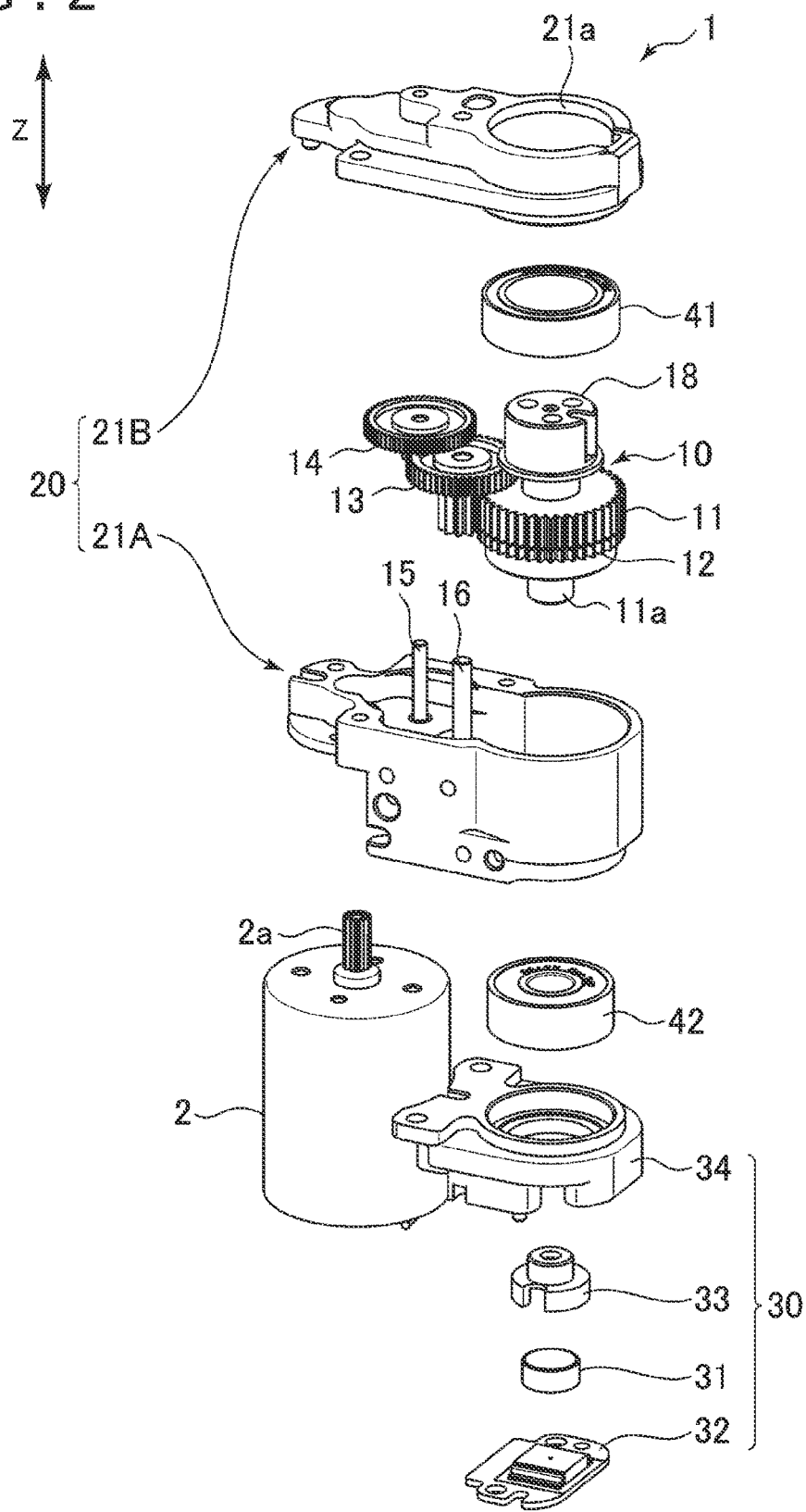
FIG. 2 is an exploded perspective view of the actuator.

As illustrated in FIG. 2, the actuator 1 has bearings 41 and 42 that support the first gear 11 and the output portion 18. The bearing 41 is fitted on the outside of the output portion 18 and is held inside the gear case 20 (more specifically, the second case member 21B). A shaft 11a of the first gear 11 protrudes to the outside of the gear case 20 (see FIG. 10). The bearing 42 is held outside the gear case 20 (first case member 21A) and is fitted to the outside of the protruding portion of the shaft 11a protruding from the gear case 20 to support the shaft 11a.

[Sensor Assembly]

As illustrated in FIG. 2, the actuator 1 has a sensor assembly 30 for detecting the operation of the actuator 1. The sensor assembly 30 includes a magnetic rotation sensor, for example. To be specific, the sensor assembly 30 has a magnet 31 and a sensor substrate 32 that outputs a signal according to a change in the angular position of the magnet 31. Further, the sensor assembly 30 has a magnet holder 33 that holds the magnet 31 and rotates integrally with the shaft 11a of the first gear 11, and a sensor holder 34 to which the sensor substrate 32 is attached. The magnet holder 33 is connected to the shaft 11a of the first gear 11 and rotates integrally with the shaft 11a of the first gear 11. In the example of the actuator 1, the shaft 11a of the first gear 11 is fitted in half of the bearing 42, and the magnet holder 33 is fitted in the other half of the bearing 42. That is, the magnet holder 33 and the shaft 11a of the first gear 11 are connected via the bearing 42. The sensor holder 34 is attached to the gear case 20 (more specifically, the first case member 21A), and supports the sensor substrate 32 so that the magnet 31 and the sensor substrate 32 face each other in the axial direction. Note that the rotation sensor including the magnet 31 and the sensor substrate 32 may be provided on the second gear 13, the third gear 14, or the gear 2a of the electric motor 2 arranged upstream of the first gear 11. Further, the type of the rotation sensor possessed by the actuator 1 is not limited to the magnetic type.

[Manufacturing Method]

Since the scissors gear 12 is urged in a rotational direction, the angular positions of the gear teeth of the scissors gear 12 (phase of the gear teeth) do not coincide with the angular positions of the gear teeth of the first gear 11 (phase of the gear teeth). Therefore, when the gears 11, 12, and 13 are put into the gear case 20 in the manufacturing process of the actuator 1, there is a case where the gear teeth of the second gear 13 interfere with either the gear teeth of the first gear 11 or the gear teeth of the scissors gear 12, and the work of setting the gears 11 and 12 in the gear case 20 becomes complicated. Therefore, the actuator 1 is manufactured by the method described below.

Figure 5:
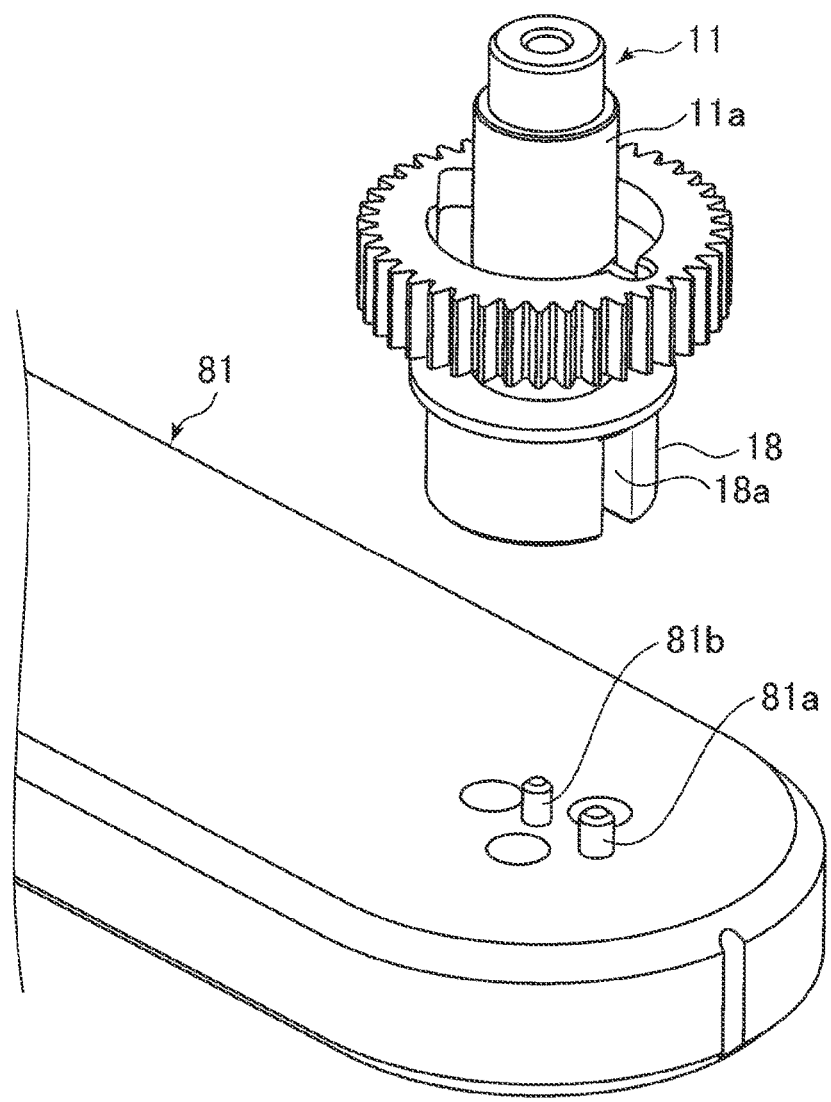
FIG. 5 is a diagram for describing a manufacturing method and illustrates a state in which the first gear is attached to a first jig.

As illustrated in FIG. 5, the first gear 11 is attached to a first jig 81. As described above, the first gear 11 and the output portion 18 are integrally formed. Holes 18a and 18b (see FIG. 3B) are formed on the end face of the output portion 18. A plurality of protrusions 81a and 81b formed on the first jig 81 are fitted into the holes 18a and 18b of the output portion 18.

Figure 6A:
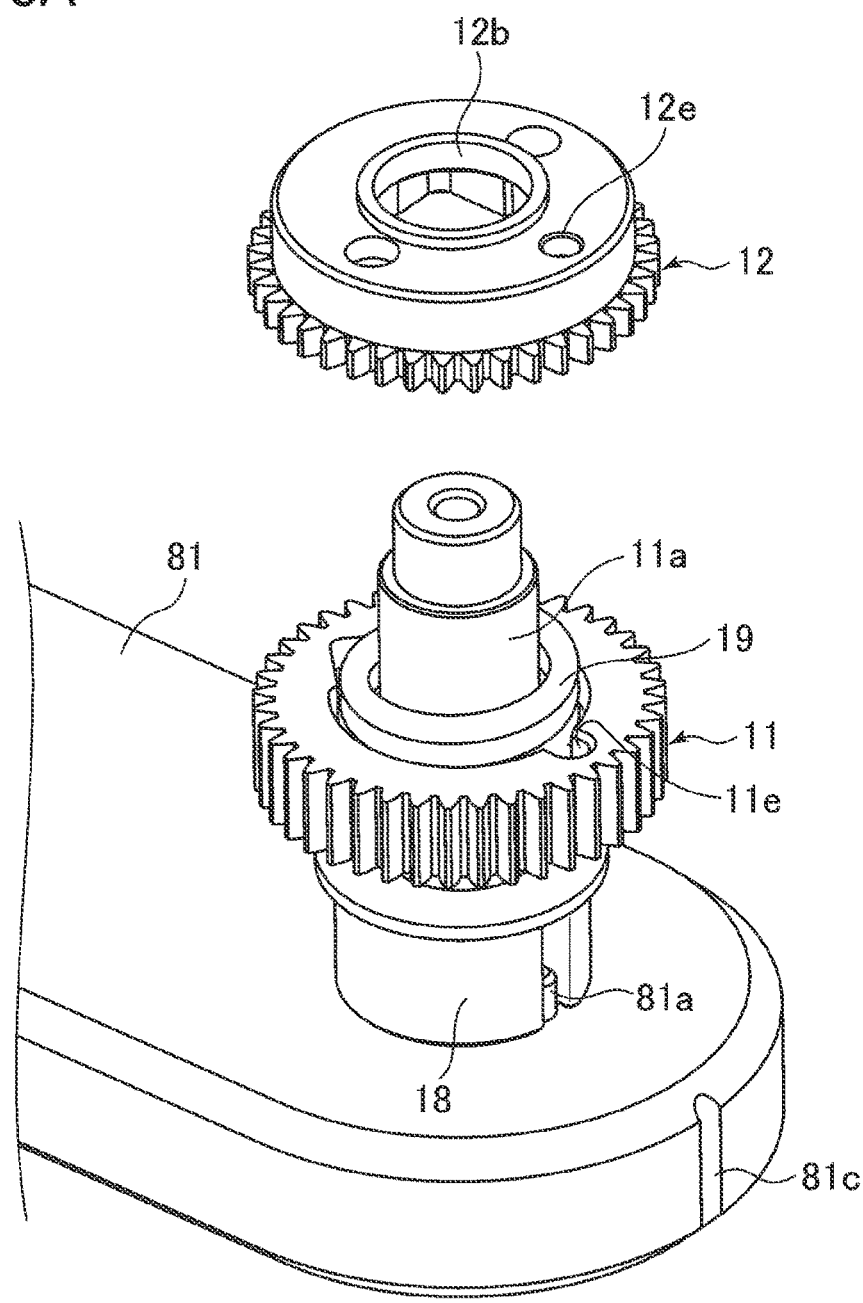
FIG. 6A is a diagram for describing a manufacturing method and illustrates a state in which the scissors gear is combined with the first gear.

Next, as illustrated in FIG. 6A, the torsion spring 19 is attached to the first gear 11 and the scissors gear 12. In the example of the actuator 1, the first gear 11 has the shaft 11a, the torsion spring 19 is fitted to the shaft 11a, and then the first gear 11 and the scissors gear 12 are combined in the axial direction. Then, the shaft 11a is fitted into a hole 12b formed in the scissors gear 12. The first gear 11 and the scissors gear 12 have recesses 11c and 12c (see FIG. 8B) surrounding the shaft 11a, on the surfaces of these gears facing each other, respectively. The torsion spring 19 fits in the recesses 11c and 12c. A receiving portion 11d (see FIG. 4) that receives force in a rotational direction coming from the torsion spring 19 is formed on the inner surface of the recess 11c of the first gear 11. Similarly, a receiving portion that receives force in a rotational direction coming from the torsion spring 19 is also formed on the inner surface of the recess 12c of the scissors gear 12.

Figure 6B:
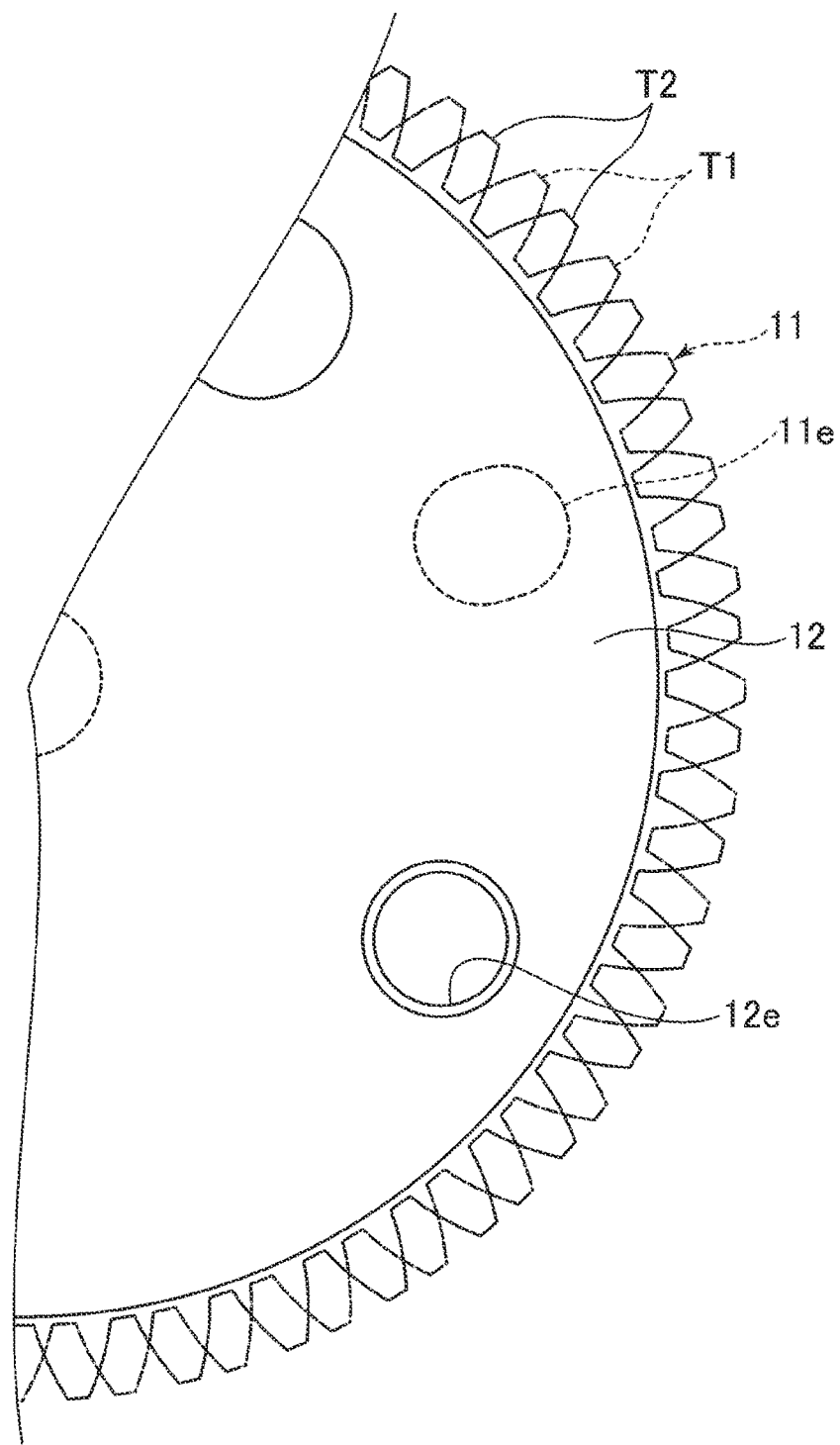
FIG. 6B is a view illustrating the first gear and the scissors gear viewed in the axial direction when the torsion spring is in an initial state, and illustrates a state in which an angular position of the first gear and an angular position of the scissors gear are deviated from each other.

As illustrated in FIG. 6B, when the torsion spring 19 is in an initial state (a state in which the positions of the gears 11 and 12 are not fixed by a fixing member 82 described later, for example, a state in which no load is applied to the torsion spring 19), the angular positions of the gear teeth of the first gear 11 (phase of the gear teeth) do not coincide with the angular positions of the gear teeth of the scissors gear 12 (phase of the gear teeth). (In FIG. 6B, a gear tooth T2 of the scissors gear 12 is located between the two adjacent gear teeth T1 of the first gear 11.)

[Position Fixing Process]

Next, the first gear 11 and the scissors gear 12 are relatively moved in a rotational direction against the elastic force of the torsion spring 19, so that the angular positions of the gear teeth of the two gears 11 and 12 are made to coincide with each other. The angular positions of the gears 11 and 12 are fixed by the fixing member 82 in a state where the angular positions of the gear teeth of the two gears 11 and 12 coincide with each other (see FIG. 7A). This process can be performed as follows, for example.

The fitting hole 11e (see FIG. 4) is formed in the first gear 11, and the fitting hole 12e (see FIG. 4) is formed also in the scissors gear 12. Then, the distance from the rotation center line $A^{\times}2$ to the fitting hole 11e and the distance from the rotation center line $A^{\times}2$ to the fitting hole 12e are the same. When the angular position of the fitting hole 11e coincides with the angular position of the fitting hole 12e, the angular positions (phase) of the gear teeth of the first gear 11 and the angular positions (phase) of the gear teeth of the scissors gear 12 coincide with each other. Here, "the angular positions of the gear teeth coincide with each other" means that the angular positions of the gear teeth are the same to such a degree that the gear teeth of the second gear 13 can be engaged with the gear teeth of the two gears 11 and 12. In other words, if the gear teeth of the second gear 13 can be engaged with the gear teeth of the two gears 11 and 12, the angular positions of the gear teeth of the gears 11 and 12 are allowed to be slightly different from each other.

As illustrated in FIG. 6B, when the torsion spring 19 is in the initial state, the angular position of the fitting hole 11e and the angular position of the fitting hole 12e are out of alignment with each other. The first gear 11 and the scissors gear 12 are relatively moved in a rotational direction against the elastic force of the torsion spring 19, so that the angular position of the fitting hole 11e is made to coincide with the angular position of the fitting hole 12e. For example, as illustrated in FIG. 7A, the rod-shaped fixing member 82 is axially inserted into the fitting hole 12e (see FIG. 6A) of the scissors gear 12. In this state, since the fitting hole 11e of the first gear 11 is out of alignment with the fitting hole 12e of the scissors gear 12, the fixing member 82 is not fitted into the fitting hole 11e of the first gear 11 (see FIG. 6A). Next, the fixing member 82 and the scissors gear 12 are rotated relative to the first gear 11 using a second jig 83, so that the angular position of the fitting hole 12e is made to coincide with the angular position of the fitting hole 11e. After the angular positions of the fitting holes 12e and 11e are made to coincide with each other as illustrated in FIG. 8A, the fixing member 82 is further pushed in as illustrated in FIG. 8B, to be inserted into the fitting hole 11e of the first gear 11. As a result, the angular positions of the gears 11 and the scissors gear 12 are fixed in a state where the angular positions of the gear teeth of the first gear 11 coincide with the angular positions of the gear teeth of the scissors gear 12.

As illustrated in FIG. 8B, the fitting holes 11e and 12e are formed on the outer side of the torsion spring 19 in the radial direction. At least one of the fitting holes 11e and 12e is a through hole extending in the axial direction in the gear 11 or 12. Further, the other fitting hole is a through hole extending in the axial direction in the gear 11 or 12, or a recess that extends in the axial direction but is not a through hole. In the example of the actuator 1, the fitting hole 12e is a through hole extending in the axial direction in the scissors gear 12. The fitting hole 11e is a hole that does not pass through the first gear 11. A fitting hole of the two fitting holes 11e and 12e which is close to the opening 21e (see FIG. 10) formed in the gear case 20 is a through hole, and the other fitting hole does not have to be a through hole.

It should be noted that the first jig 81 and the second jig 83 each are rod-shaped and extend in a radial direction from the rotation center line A" 2, for example. By using such jigs 81 and 83, even in the case where the scissors gear 12 and the first gear 11 are small, the assembly worker can relatively easily perform relative rotation of the gears.

As illustrated in FIG. 7A, a hole 83a into which the shaft 11a of the first gear 11 is fitted and which supports the shaft 11a and a hole 83e into which the fixing member 82 is inserted are formed on the second jig 83. The scissors gear 12 is formed with fitting holes 12f (see FIG. 4) in addition to the fitting hole 12e. Protrusions formed on the second jig 83 may be fitted in the fitting holes 12f. According to this, the scissors gear 12 and the fixing member 82 can be smoothly rotated by using the second jig 83.

Figure 7B:
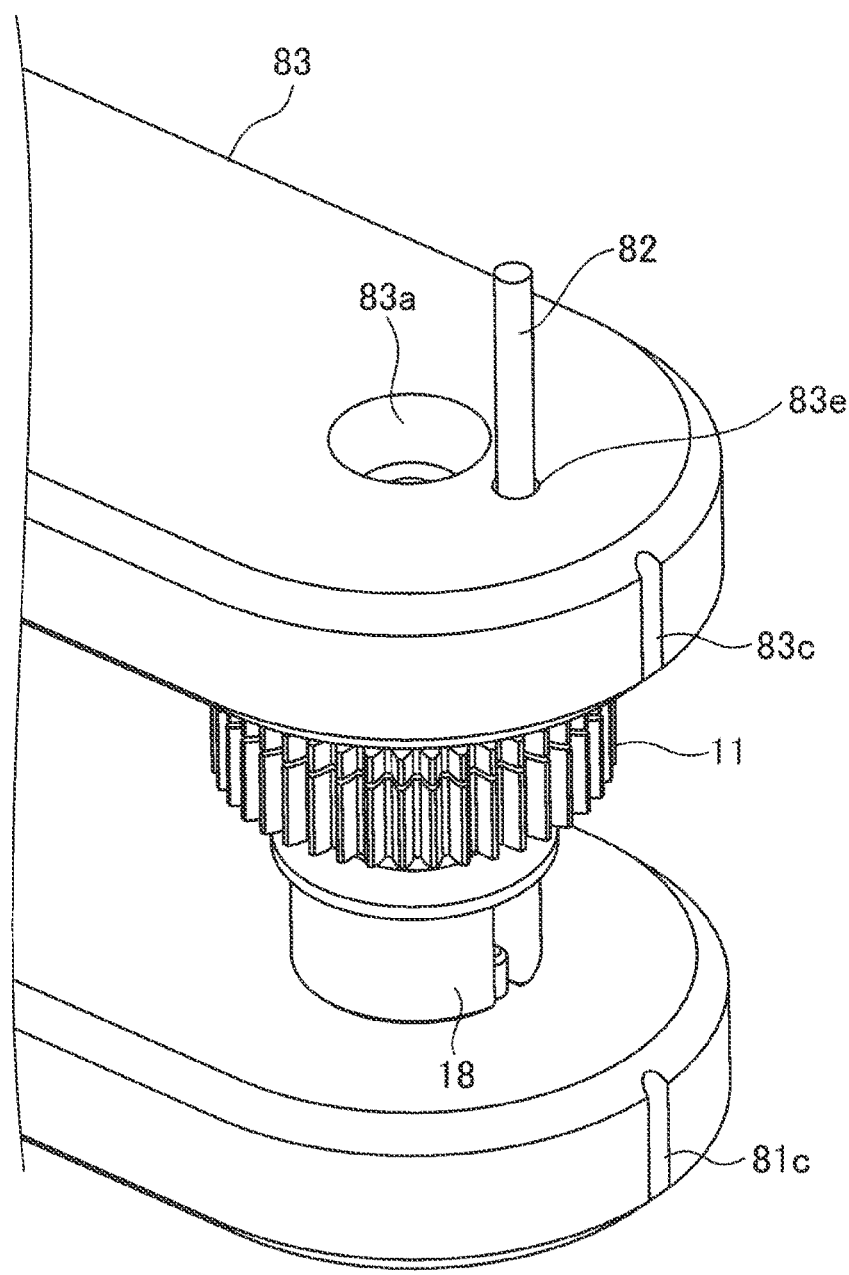
FIG. 7B is a diagram for describing the manufacturing method (position fixing process) and illustrates a state in which the scissors gear is rotated by using the second jig.
Figure 8A:
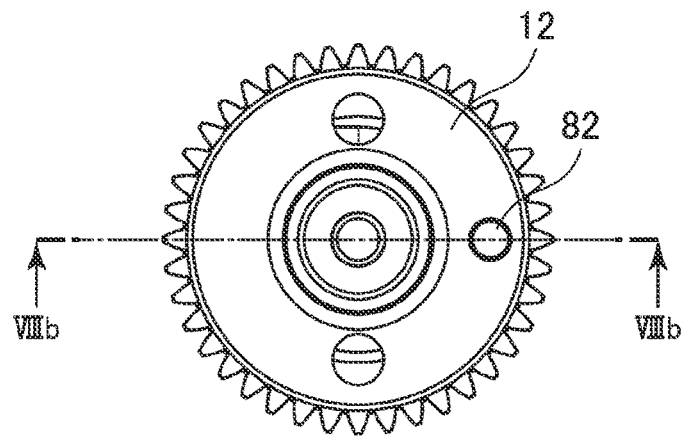
FIG. 8A is a diagram for describing the manufacturing method (position fixing process) and is a diagram in which the angular position of the first gear and the angular position of the scissors coincide with each other, which are viewed in the axial direction.
Figure 8B:
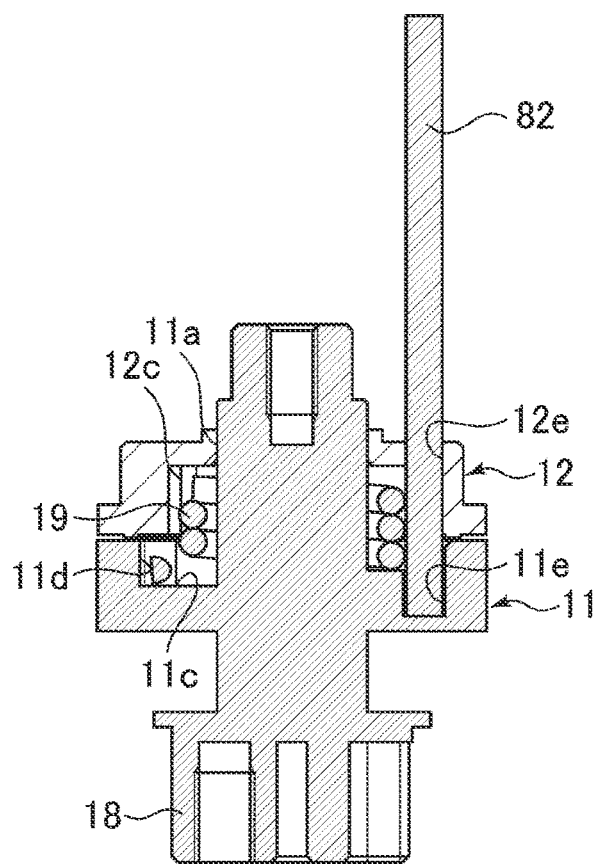
FIG. 8B is a cross-sectional view taken along the sectional surface illustrated by line VIIIb-VIIIb in FIG. 8A.

As illustrated in FIG. 7B, when the two jigs 81 and 83 are arranged in parallel, the angular position of the fitting hole 11e of the first gear 11 coincides with the angular position of the fitting hole 12e of the scissors gear 12. This makes it possible to facilitate the work of causing the positions of the fitting holes 11e and 12e to coincide with each other. Marks 81c and 83c may be formed on the jigs 81 and 83. The marks 81c and 83c may be formed such that the angular positions of the fitting holes 11e and 12e coincide with each other when the angular positions of the marks 81c and 83 coincide with each other.

Incidentally, the method of moving the first gear 11 and the scissors gear 12 relatively in a rotational direction is not limited to the example described here. For example, the jigs 81 and 83 do not necessarily have to be used at the time of rotating the gears 11 and 12.

[Gear Incorporating Process]

Figure 9A:
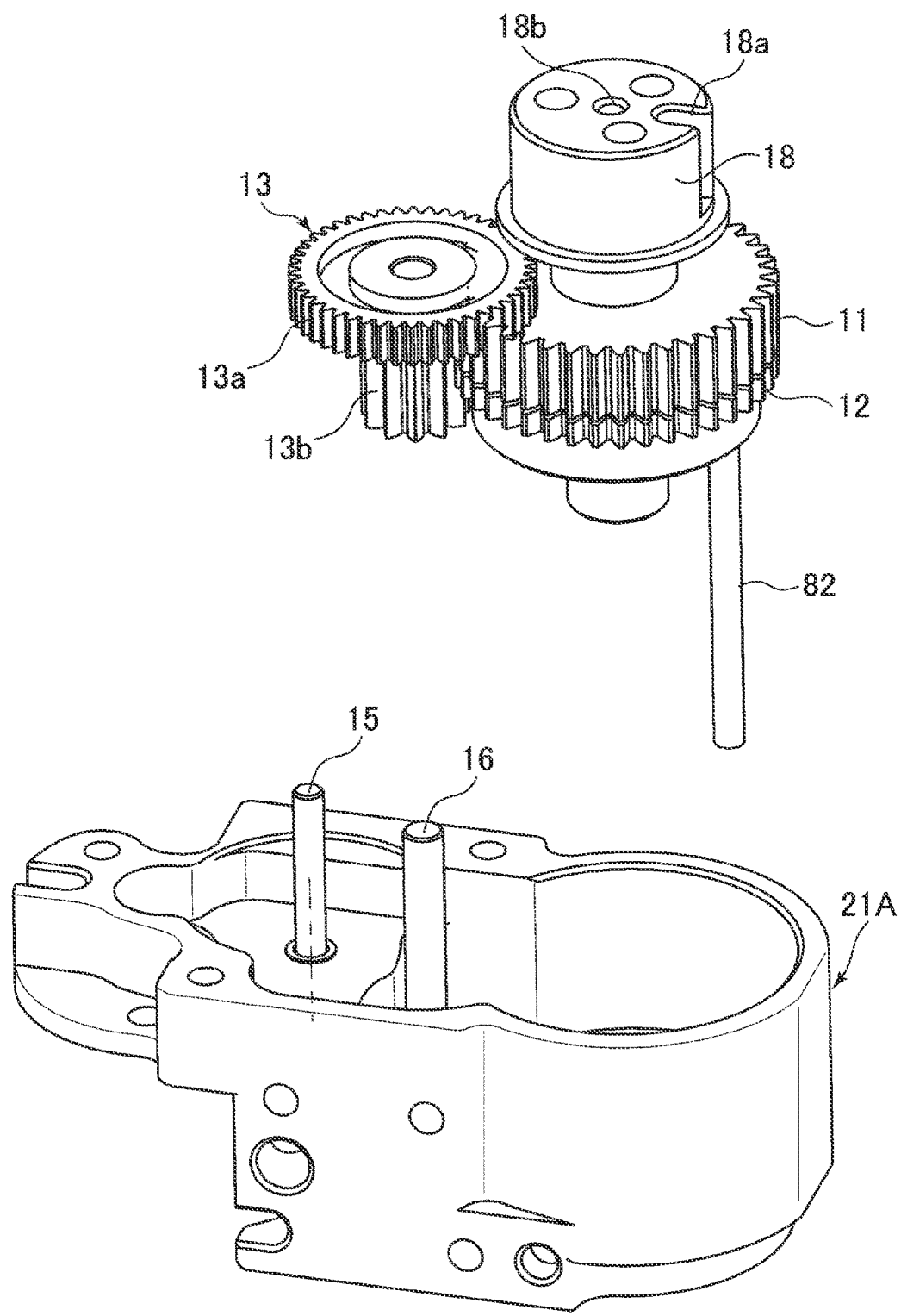
FIG. 9A is a diagram for describing a manufacturing method (gear incorporating process), and illustrates a state in which the first gear, the scissors gear, and a second gear are incorporated in a first case member.

After fixing the positions of the first gear 11 and the scissors gear 12 by using the fixing member 82, the first gear 11, scissors gear 12, and second gear 13 whose positions are fixed are incorporated into the gear case 20, as illustrated in FIG. 9A. To be specific, first, the gears 11 to 13 are incorporated into one of the case members (in the example of the actuator 1, the first case member 21A). At this time, the gear teeth of the second gear 13 (more specifically, the small-diameter gear portion 13b) is engaged with the gear teeth of the first gear 11 and the gear teeth of the scissors gear 12.

Figure 9B:
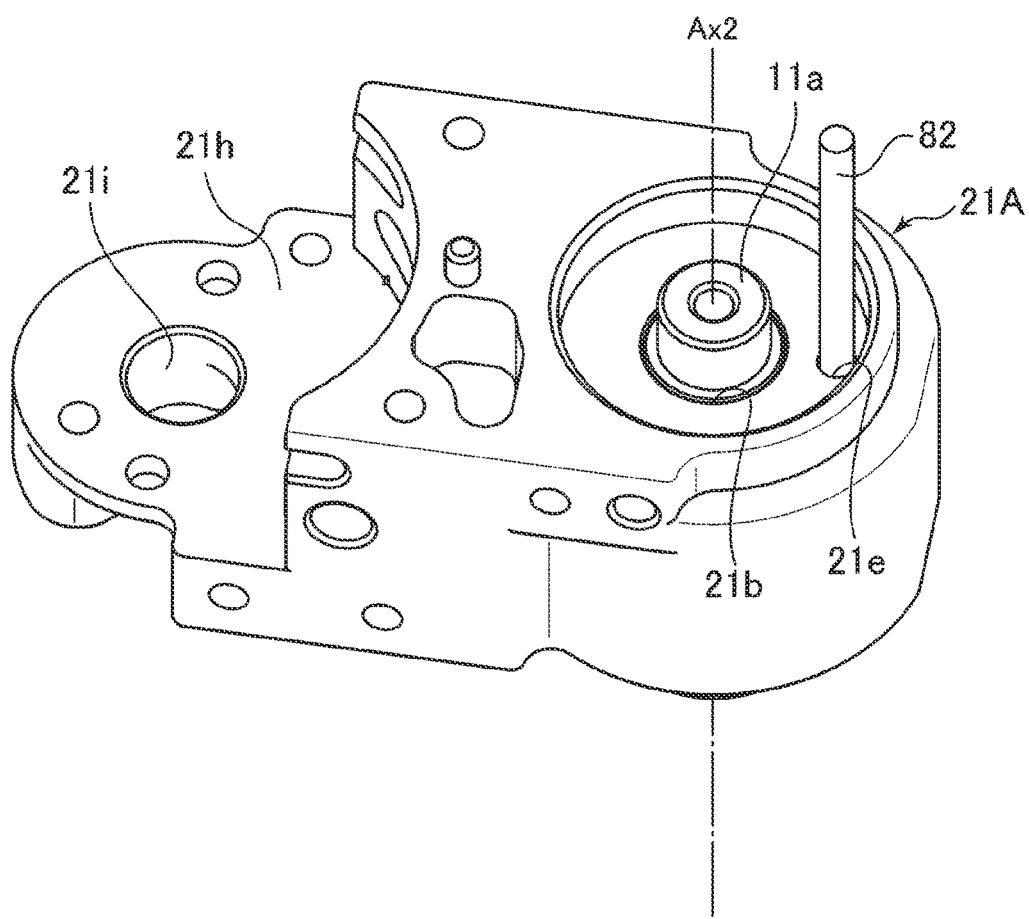
FIG. 9B is a diagram for describing the manufacturing method (gear incorporating process) and illustrates a state in which a fixing pin protrudes from the first case member.

As illustrated in FIG. 9B, the first case member 21A is formed with the opening 21e that passes through the first case member 21A in the axial direction. The opening 21e is formed at a position where the fitting hole 11e of the first gear 11 and the fitting hole 12e of the scissors gear 12 can be exposed. To be specific, the distance between the rotation center line $A^x 2$ and the opening 21e is the same as the distance between the rotation center line $A^x 2$ and the fitting holes 11e and 12e formed in the gears 11 and 12. Therefore, the fitting hole 11e of the first gear 11, the fitting hole 12e of the scissors gear 12, and the opening 21e of the gear case 20 can be aligned in the axial direction. When the gears 11 to 13 are inserted into the first case member 21A, the rod-shaped fixing member 82 protrudes to the outside of the first case member 21A through the opening 21e.

Figure 9C:
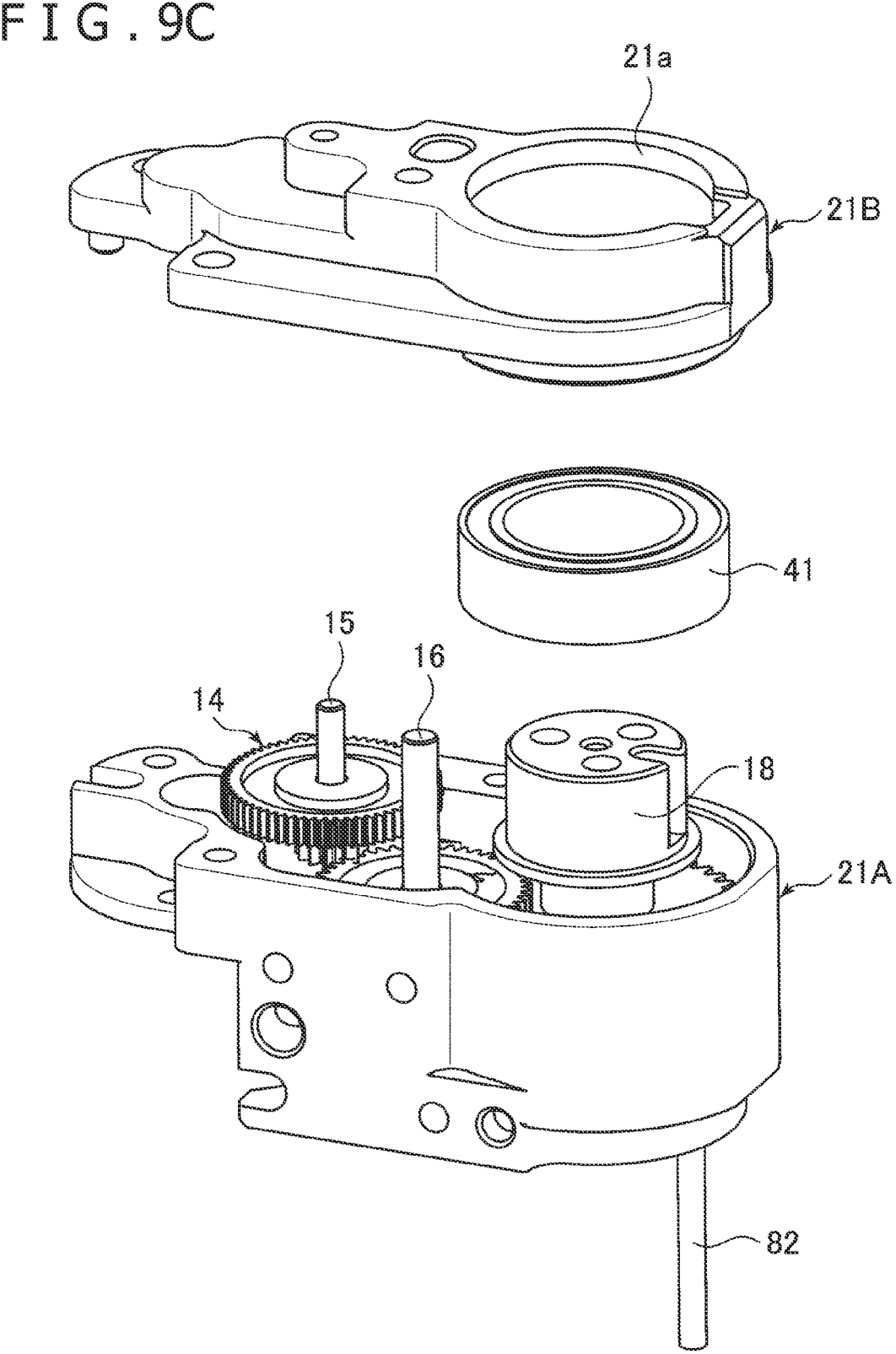
FIG. 9C is a diagram for describing the manufacturing method (gear incorporating process) and illustrates a state in which a first case member and a second case member are combined.

Further, when the gears 11 to 13 are inserted into the first case member 21A, the shaft 11a of the first gear 11 protrudes from an opening 21b formed in the first case member 21A. The second gear 13 is supported by the support shaft 16 (see FIG. 9A) attached to the first case member 21A. Next, as illustrated in FIG. 9C, the third gear 14 is further housed in the first case member 21A. The third gear 14 is supported by the support shaft 15 attached to the first case member 21A. Further, after fitting the bearing 41 on the outside of the output portion 18, the second case member 21B and the first case member 21A are combined in the axial direction.

When the actuator 1 is viewed in the axial direction, the sizes of the fitting holes 11e and 12e and the size of the opening 21e may be substantially the same. Further, as described above, the distance between the rotation center line $A^x 2$ and the opening 21e is the same as the distance between the rotation center line $A^x 2$ and the fitting holes 11e and 12e formed in the gears 11 and 12. "The distance from the rotation center line $A^x 2$ to the opening 21e is the same as the distance between the rotation center line $A^x 2$ and the fitting holes 11e and 12e." and "the sizes of the fitting holes 11e and 12e and the size of the opening 21e are substantially the same." mean that the fixing member 82 can be inserted into the fitting holes 11e and 12e and the opening 21e when the angular position of the opening 21e and the angular positions of the fitting holes 11e and 12e are made to be the same. If the fixing member 82 can be inserted into these holes 11e and 12e and the opening 21e, the distance from the rotation center line $A^x 2$ to the center of the opening 21e and the distance between the rotation center line $A^x 2$ and the centers of the fitting holes 11e and 12e are allowed to be slightly different from each other. Similarly, if the fixing member 82 can be inserted into these holes 11e and 12e and the opening 21e, the sizes of the fitting holes 11e and 12e and the size of the opening 21e are allowed to be slightly different from each other.

[Fixing Release Process]

Figure 10:
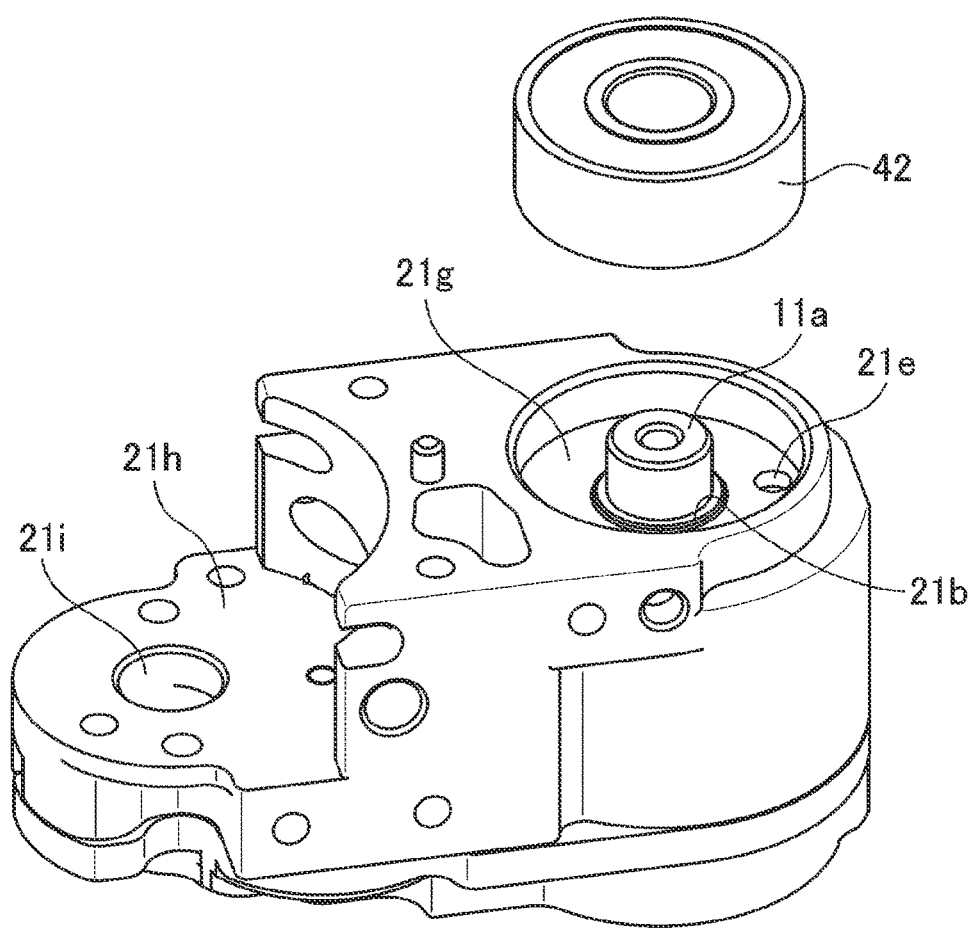
FIG. 10 is a diagram for describing a manufacturing method and illustrates a state in which the fixing pin is removed and a bearing is mounted.

After the first case member 21A and the second case member 21B are combined, the fixation of the angular position of the first gear 11 and the angular position of the scissors gear 12 by the fixing member 82 is released by using the opening 21e formed on the gear case 20. To be specific, as illustrated in FIG. 10, the fixing member 82 is axially pulled through the opening 21e formed in the first case member 21A, to be pulled out from the fitting holes 11e and 12e of the gears 11 and 12. When the fixing member 82 is pulled out, the scissors gear 12 and the first gear 11 receive the elastic force of the torsion spring 19 and move relatively in a rotational direction. Then, a gear tooth of the second gear 13 which is disposed between a gear tooth of the scissors gear 12 and a gear tooth of the first gear 11 becomes sandwiched between these gear teeth.

As illustrated in FIG. 10, after the fixing member 82 is removed from the fitting holes 11e and 12e of the gears 11 and 12, the bearing 42 is attached to the first case member 21A. The shaft 11a of the first gear 11 protrudes axially from the opening 21b of the first case member 21A, and the bearing 42 is fitted in this protruding portion. After that, the sensor assembly 30 (see FIG. 2) is attached to the first case member 21A.

As illustrated in FIG. 10, the opening 21e of the first case member 21A through which the fixing member 82 passes may be formed at a position overlapping with the bearing 42 when viewed in the axial direction. In the example of the actuator 1, the opening 21e may be formed in a bottom surface 21g of the recess that holds the bearing 42. When the bearing 42 is attached to the first case member 21A, the opening 21e is covered with the bearing 42. This makes it possible to prevent dust and the like from entering the gear case 20 through the opening 21e. After the bearing 42 is attached to the first case member 21A, the sensor assembly 30 is also attached to the first case member 21A. The recess holding the bearing 42 and the opening 21e may be sealed with the sensor holder 34 of the sensor assembly 30. Since the opening 21e is covered by using the bearing 42 or the sensor holder 34 in such a way, an increase in the number of components can be suppressed. Incidentally, the member covering the opening 21e does not have to be the bearing 42 or the sensor holder 34. The actuator 1 may have a dedicated member that covers the opening 21e.

As illustrated in FIG. 10, a motor holding portion 21h is formed in the first case member 21A, and the electric motor 2 is mounted on the motor holding portion 21h. At this time, the gear 2a of the electric motor 2 is inserted into an opening 21i formed in the first case member 21A. As a result, the actuator 1 is completed.

[Summary]

As described above, in the manufacturing method of the actuator 1 proposed in the present disclosure, the scissors gear 12 and the first gear 11 are combined in the axial direction, and the torsion spring 19 for urging the scissors gear 12 in a rotational direction is attached to the scissors gear 12 and the first gear 11. Next, the angular position of the first gear 11 and the angular position of the scissors gear 12 are fixed by the fixing member 82 in a state where the angular positions of the gear teeth of the first gear 11 and the angular positions of the gear teeth of the scissors gear 12 are made to coincide with each other against the elastic force of the torsion spring 19 (position fixing step). Next, the first gear 11 and the scissors gear 12 whose angular positions are fixed by the fixing member 82 and the second gear 13 are housed in the gear case 20, and the gear teeth of the second gear 13 are engaged with the gear teeth of the first gear 11 and the gear teeth of the scissors gear 12 (gear incorporating step). Then, the fixing by the fixing member 82 between the angular position of the first gear 11 and the angular position of the scissors gear 12 is released by using the opening 21e formed in the gear case 20. To be specific, the fixing member 82 is pulled through the opening 21e of the gear case 20 to be pulled out from the fitting holes 11e and 12e of the first gear 11 and the scissors gear 12. According to this method, the work of incorporating the plurality of gears 11, 12, 13, and 14 constituting the speed reduction mechanism into the gear case 20 can be facilitated.

As described above, in the actuator 1, the first gear 11 has the fitting hole 11e, and the scissors gear 12 has the fitting hole 12e. When the angular position of the fitting hole 11e of the first gear 11 coincides with the angular position of the fitting hole 12e of the scissors gear 12, the angular positions of the gear teeth of the first gear 11 coincide with the angular positions of the gear teeth of the scissors gear 12. The opening 21e capable of exposing the fitting hole 11e of the first gear 11 and the fitting hole 12e of the scissors gear 12 is formed on the gear case 20. According to this structure, since the manufacturing method described above is possible, the work of incorporating a plurality of gears constituting the speed reduction mechanism into the gear case can be facilitated.

[Modification Example]

It should be noted that the manufacturing method and the actuator proposed in the present disclosure are not limited to the example of the actuator 1.

For example, the fixing member for fixing the angular positions of the gear teeth of the first gear 11 and the angular positions of the gear teeth of the scissors gear 12 does not have to be rod-shaped. For example, the fixing member may be capable of being attached to the first gear 11 and the scissors gear 12 in the radial direction. In this case, an opening located in the radial direction with respect to the first gear 11 and the scissors gear 12 may be formed on the gear case 20. Then, the fixing member may be removed by using this opening.

Further, the fixing member 82 does not necessarily have to protrude from the gear case 20. For example, the fixing member 82 may be disposed in the gear case 20. In this case, the fixing member 82 may be taken out of the gear case 20 through the opening formed on the gear case 20 in the fixing releasing step.

[Robot]

Figure 11:
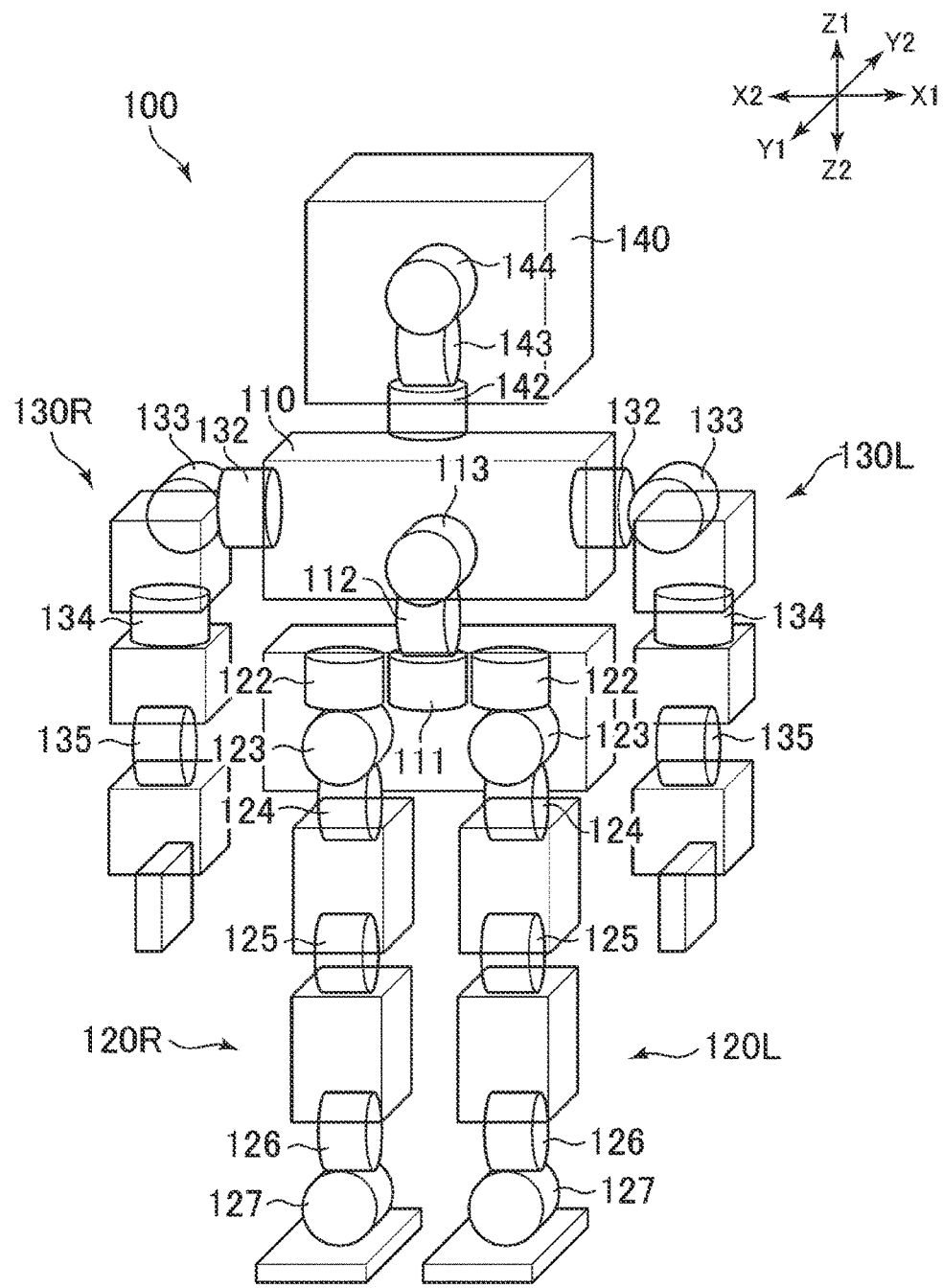
FIG. 11 is a schematic diagram illustrating an example of a robot to which the actuator proposed in the present disclosure can be applied.

FIG. 11 is a schematic view illustrating an example of a robot to which the actuator 1 can be applied. The robot 100 is a robot capable of bipedal walking and has a right leg 120R and a left leg 120L. Each of the legs 120R and 120L is provided with a plurality of actuators for moving the leg 120R or 120L. Each of the legs 120R and 120L has, for example, actuators 126 and 127 at the ankle joint, an actuator 125 at the knee joint, and actuators 122, 123, and 124 at the hip joint. Further, the robot 100 has a right arm 130R and a left arm 130L. Each of the arms 130R and 130L is provided with a plurality of actuators for moving the leg 130R or 130L. Each of the arms 130R and 130L has, for example, an actuator 135 at the elbow joint, an actuator 134 at the upper arm, and actuators 132 and 133 at the shoulder joint. The robot 100 has a plurality of actuators 142, 143, and 144 for moving the head 140. The robot 100 has a plurality of actuators 111, 112, and 113 for moving the body 110. The structure of the actuator 1 described with reference to FIG. 1 and the like may be applied to some or all of the plurality of actuators possessed by the robot 100.

The invention claimed is:

1. A method for manufacturing an actuator including a speed reduction mechanism having a first gear, a scissors gear, and a second gear, gear teeth of the first gear and gear teeth of the scissors gear being engaged with gear teeth of the second gear, the method comprising:

attaching an elastic member for urging the scissors gear in a rotational direction to the scissors gear and the first gear when combining the scissors gear and the first gear in an axial direction;

fixing an angular position of the first gear and an angular position of the scissors gear by a fixing member in a state where angular positions of the gear teeth of the first gear and angular positions of the gear teeth of the scissors gear are made to coincide with each other against force of the elastic member;

incorporating into a gear case, the first gear and the scissors gear whose angular positions are fixed by the fixing member and the second gear, to engage the gear teeth of the second gear with the gear teeth of the first gear and the gear teeth of the scissors gear; and releasing the fixing of the angular position of the first gear and the angular position of the scissors gear performed by the fixing member, by using an opening formed on the gear case wherein the fixing includes inserting the fixing member into the first gear and the scissors gear in the axial direction to fix the angular positions of these gears.

2. The method for manufacturing an actuator according to claim 1, wherein the fixing includes fixing the angular position of the first gear and the angular position of the scissors gear by causing an angular position of a fitting hole formed in the first gear and an angular position of a fitting hole formed in the scissors gear to coincide with each other, and then inserting the fixing member into the fitting hole formed in the first gear and the fitting hole formed in the scissors gear, and the releasing includes pulling out the fixing member from the fitting hole formed in the first gear and the fitting hole formed in the scissors gear.

3. The method for manufacturing an actuator according to claim 1, wherein: a member covering the opening of the gear case is attached to the gear case after the fixing member is removed.

4. An actuator comprising:
a speed reduction mechanism; and
a gear case that houses the speed reduction mechanism, wherein the speed reduction mechanism includes
a first gear having gear teeth,
a scissors gear that is combined with the first gear in an axial direction and has gear teeth,
a second gear having gear teeth that engage with the gear teeth of the first gear and the gear teeth of the scissors gear, and
an elastic member that is attached to the first gear and the scissors gear and urges the scissors gear in a rotational direction,
the first gear having a fitting portion,
the scissors gear having a further fitting portion, and
when an angular position of the fitting portion of the first gear coincides with an angular position of the further fitting portion of the scissors gear, angular positions of the gear teeth of the first gear coincide with angular positions of the gear teeth of the scissors gear, and
an opening capable of exposing the fitting portion of the first gear and the further fitting portion of the scissors gear is formed on the gear case,
wherein at least one of the fitting portion of the first gear and the further fitting portion of the scissors gear is a hole that passes through a gear in which the at least one fitting portion is formed in the axial direction.

5. The actuator according to claim 4, wherein the fitting portion of the first gear, the further fitting portion of the scissors gear, and the opening of the gear case are aligned in the axial direction.

6. The actuator according to claim 5, wherein a distance from a rotation center line to the fitting portion of the first gear, a distance from the rotation center line to the further fitting portion of the scissors gear, and a distance from the rotation center line to the opening of the gear case are identical.

7. The actuator according to claim 4, further comprising: a member that covers the opening of the gear case.

* * * * *